United States Patent
Hasenberg et al.

(10) Patent No.: US 10,336,614 B2
(45) Date of Patent: Jul. 2, 2019

(54) HYDROGEN SULFIDE PRODUCTION PROCESS AND RELATED REACTOR VESSELS

(71) Applicant: Chevron Phillips Chemical Company LP, The Woodlands, TX (US)

(72) Inventors: Daniel M. Hasenberg, Kingwood, TX (US); Alex Pauwels, Deurne (BE); Ives Mertens, Herenthout (BE)

(73) Assignee: Chevron Phillips Chemical Company, LP, The Woodlands, TX (US)

( * ) Notice: Subject to any disclaimer, the term of this patent is extended or adjusted under 35 U.S.C. 154(b) by 0 days.

(21) Appl. No.: 16/029,731

(22) Filed: Jul. 9, 2018

(65) Prior Publication Data

US 2018/0319663 A1 Nov. 8, 2018

Related U.S. Application Data

(60) Division of application No. 15/244,024, filed on Aug. 23, 2016, now Pat. No. 10,040,684, which is a
(Continued)

(51) Int. Cl.
*B01J 4/00* (2006.01)
*B01J 10/00* (2006.01)
(Continued)

(52) U.S. Cl.
CPC ............ *C01B 17/162* (2013.01); *B01J 4/002* (2013.01); *B01J 4/004* (2013.01); *B01J 10/005* (2013.01);
(Continued)

(58) Field of Classification Search
CPC ...... B01J 4/00–002; B01J 4/004; B01J 10/00; B01J 10/005; B01J 19/00–0013; B01J 19/24; B01J 19/2455; B01J 19/2465; B01J 19/30; B01J 2219/00049; B01J 2219/00051; B01J 2219/00074;
(Continued)

(56) References Cited

U.S. PATENT DOCUMENTS 1,700,578 A * 1/1929 Bacon .................. C01B 17/162
423/563
2,214,859 A 9/1940 Maude et al.
(Continued)

FOREIGN PATENT DOCUMENTS

CA 2 901 184 8/2014
CN 102115033 7/2011
(Continued)

OTHER PUBLICATIONS

International Search Report and the Written Opinion of the International Searching Authority in PCT/US2015/065071 dated Aug. 18, 2016, 13 pages.
(Continued)

*Primary Examiner* — Natasha E Young
(74) *Attorney, Agent, or Firm* — Merchant & Gould P.C.

(57) ABSTRACT

The present invention discloses a hydrogen sulfide reactor vessel with an external heating system that is conductively and removably attached to an exterior portion of the reactor vessel. Also disclosed are processes for producing hydrogen sulfide utilizing the reactor vessel.

19 Claims, 5 Drawing Sheets

Related U.S. Application Data continuation of application No. PCT/US2015/065071, filed on Dec. 10, 2015.

(51) Int. Cl.

| | | |
|---|---|---|
| *B01J 19/00* | (2006.01) | |
| *B01J 19/24* | (2006.01) | |
| *C01B 17/16* | (2006.01) | |
| *B01J 19/30* | (2006.01) | |

(52) U.S. Cl.
CPC ........... *B01J 19/0013* (2013.01); *B01J 19/24* (2013.01); *B01J 19/2465* (2013.01); *B01J 19/30* (2013.01); *B01J 2219/0009* (2013.01); *B01J 2219/00081* (2013.01); *B01J 2219/00083* (2013.01); *B01J 2219/00092* (2013.01); *B01J 2219/00101* (2013.01); *B01J 2219/00103* (2013.01); *B01J 2219/00135* (2013.01); *B01J 2219/00155* (2013.01); *B01J 2219/00765* (2013.01); *B01J 2219/0286* (2013.01); *B01J 2219/182* (2013.01); *B01J 2219/185* (2013.01); *B01J 2219/24* (2013.01)

(58) Field of Classification Search
CPC .... B01J 2219/00076; B01J 2219/00081; B01J 2219/00083; B01J 2219/00087; B01J 2219/0009; B01J 2219/00092; B01J 2219/00101; B01J 2219/00103; B01J 2219/00132; B01J 2219/00135; B01J 2219/0015; B01J 2219/00155; B01J 2219/00761–00765; B01J 2219/02; B01J 2219/025; B01J 2219/0277; B01J 2219/0286; B01J 2219/18; B01J 2219/182; B01J 2219/185; B01J 2219/24; C01B 17/00; C01B 17/16–162

See application file for complete search history.

(56) References Cited

U.S. PATENT DOCUMENTS

| | | | |
|---|---|---|---|
| 2,857,250 | A | 10/1958 | Timmerman et al. |
| 2,863,725 | A | 12/1958 | Maude et al. |
| 2,876,070 | A | 3/1959 | Roberts, Jr. |
| 2,876,071 | A | 3/1959 | Updegraff |
| 5,173,285 | A | 12/1992 | Takenaka et al. |
| 7,326,397 | B2 | 2/2008 | Ramani et al. |
| 7,833,508 | B2 | 11/2010 | Redlingshöfer et al. |
| 2013/0177496 | A1 | 7/2013 | Umino et al. |
| 2014/0045129 | A1 | 2/2014 | Pickren et al. |
| 2015/0209747 | A1 | 7/2015 | Finkeldei et al. |

FOREIGN PATENT DOCUMENTS

| | | |
|---|---|---|
| CN | 102500285 | 6/2012 |
| CN | 102502523 | 6/2012 |
| CN | 202366681 | 8/2012 |
| EP | 0 339 818 | 4/1995 |
| WO | WO 2004/017007 | 2/2004 |

OTHER PUBLICATIONS

ThermEx International NV, brochure entitled, "*ThermEx Bolt-On Heating Systems,*" ThermEx Bulletin CTCH-1, 12 pages.

Daniel M. Hasenberg, Ph.D., "Declaration of Daniel M. Hansenberg, Ph.D.," Apr. 27, 2018, pp. 1-2.

\* cited by examiner

HYDROGEN SULFIDE PRODUCTION PROCESS AND RELATED REACTOR VESSELS

CROSS-REFERENCE TO RELATED APPLICATIONS

This application is a divisional application of co-pending U.S. patent application Ser. No. 15/244,024, filed on Aug. 23, 2016, now U.S. Pat. No. 10,040,684, which is a continuation application of PCT international patent application PCT/US2015/065071, now WO 2017/099783, filed on Dec. 10, 2015, the disclosures of which are incorporated herein by reference in their entirety.

FIELD OF THE INVENTION

The present disclosure concerns reactor vessels for the production of $H_2S$, and more particularly relates to heating systems for reactor vessels containing liquid sulfur.

BACKGROUND OF THE INVENTION

There are various techniques that can be used to heat and maintain a reactor vessel containing liquid sulfur at an appropriate start-up and steady-state operating temperature. However, known techniques have drawbacks due to the corrosive nature of the reactor contents, as well as the extreme temperature range encountered during a production cycle (from start-up to steady-state production to shutdown), which can often span a temperature range of 500° C. or more. Therefore, it would be beneficial to have reactor vessels with improved heating systems for more efficient and long-term operation. Accordingly, it is to these ends that the present disclosure is directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

Various $H_2S$ reactor vessels are described herein. In one embodiment, the $H_2S$ reactor vessel can comprise (a) a reaction chamber comprising a reactor wall, the reaction chamber configured to contain liquid sulfur; (b) a reactor inlet for liquid sulfur, the reactor inlet positioned at an upper portion of the reactor vessel; (c) a reactor outlet for liquid sulfur, the reactor outlet positioned at a lower portion of the reactor vessel; (d) a gas inlet for a hydrogen-containing gas, the gas inlet connected to a gas distributor, the gas distributor positioned above the reactor outlet for liquid sulfur and configured to inject the hydrogen-containing gas into the liquid sulfur in the reaction chamber; (e) a gas outlet for a $H_2S$-rich gas stream, the gas outlet positioned above the reactor inlet; (f) an internal heating system, the internal heating system positioned in the liquid sulfur in the reaction chamber during continuous operation of the reactor vessel and configured to maintain an operating temperature above the melting point of sulfur; and (g) an external heating system comprising a heated reactor conduit conductively and removably attached to a portion of an exterior surface of the reactor wall, wherein at least a portion of the heated reactor conduit is positioned in close proximity to the internal heating system and is configured to maintain a start-up temperature of the liquid sulfur above the melting point of sulfur at least until a level of the liquid sulfur in the reaction chamber is above the internal heating system. The standard melting point of sulfur is approximately 115.2° C.

Embodiments of this invention also are directed to a reactor vessel further comprising a quench column, generally positioned above the internal heating system and below the reactor inlet for liquid sulfur, in which the external heating system further comprises a heated column conduit conductively and removably attached to a portion of an exterior surface of the quench column. The heated column conduit can be configured to maintain a quench column operating temperature of the liquid sulfur in the quench column above the melting point of sulfur.

$H_2S$ production processes also are disclosed herein. Generally, these processes can comprise (i) controlling a reaction chamber containing liquid sulfur at a start-up temperature above the melting point of sulfur with an external heating system comprising a heated reactor conduit conductively and removably attached to a portion of an exterior surface of the reaction chamber; (ii) adding liquid sulfur to the reaction chamber to a level sufficient to immerse an internal heating system positioned within the reaction chamber; (iii) engaging the internal heating system to reach and maintain an operating temperature of the liquid sulfur of at least about 300° C.; (iv) adding a hydrogen-containing gas into the liquid sulfur and reacting to produce $H_2S$; and (v) optionally, discontinuing the operation of the external heating system.

Both the foregoing summary and the following detailed description provide examples and are explanatory only. Accordingly, the foregoing summary and the following detailed description should not be considered to be restrictive. Further, features or variations may be provided in addition to those set forth herein. For example, certain embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DEFINITIONS

Figure 1:
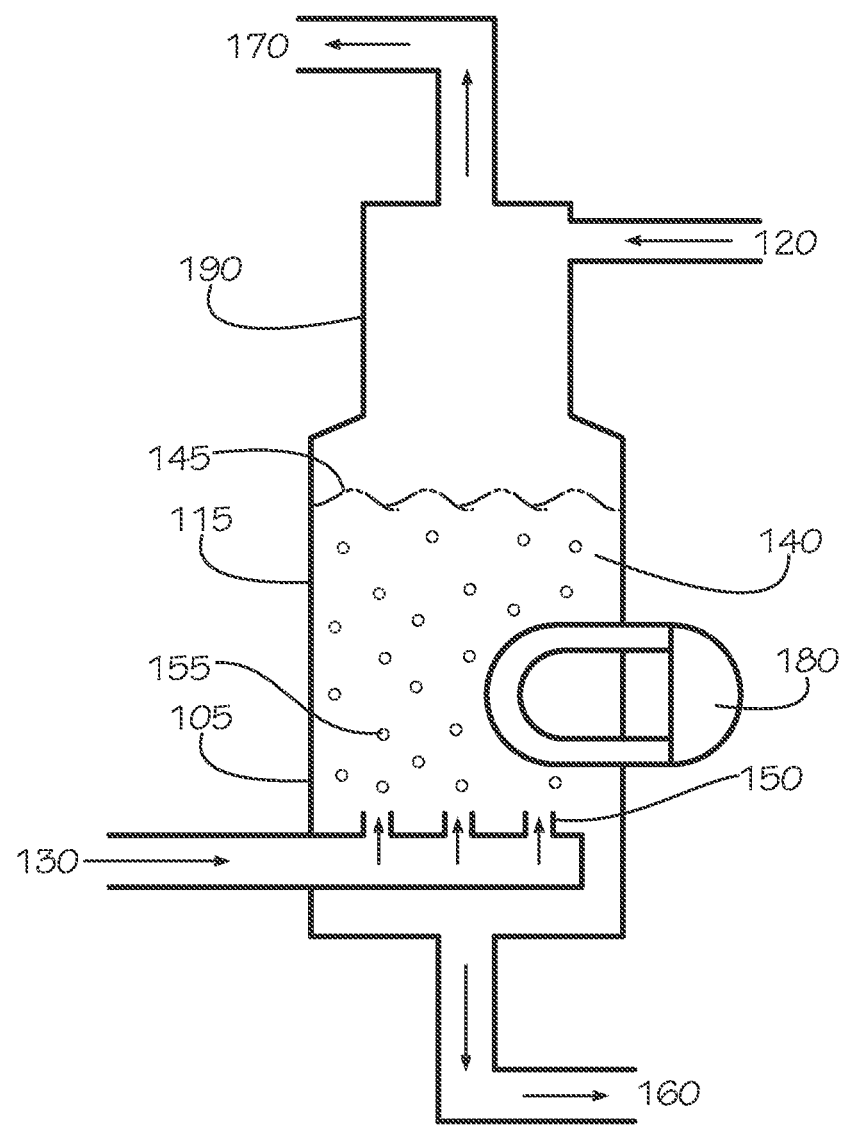
FIG. 1 is a partial cross-sectional view of a $H_2S$ reactor vessel in an embodiment of the present invention.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Herein, features of the subject matter are described such that, within particular aspects and/or embodiments, a combination of different features can be envisioned. For each and every aspect, and/or embodiment, and/or feature disclosed herein, all combinations that do not detrimentally affect the designs, processes, and/or methods described herein are contemplated with or without explicit description of the particular combination. Additionally, unless explicitly recited otherwise, any aspect, and/or embodiment, and/or feature disclosed herein can be combined to describe inventive features consistent with the present disclosure.

While apparatuses, systems, and processes are described herein in terms of "comprising" various components, devices, or steps, the apparatuses, systems, and processes can also "consist essentially of" or "consist of" the various components, devices, or steps, unless stated otherwise.

The terms "a," "an," and "the" are intended to include plural alternatives, e.g., at least one. For instance, the disclosure of "a conduit" or "a reactor outlet" is meant to encompass one, or combinations of more than one, conduit or reactor outlet, unless otherwise specified.

Various numerical ranges are disclosed herein. When a range of any type is disclosed or claimed, the intent is to disclose or claim individually each possible number that such a range could reasonably encompass, including end points of the range as well as any sub-ranges and combinations of sub-ranges encompassed therein, unless otherwise specified. As a representative example, the present disclosure recites that an operating temperature of a reactor vessel can be in a range from about 350° C. to about 600° C. in certain embodiments. By a disclosure that the temperature can be in a range from about 350° C. to about 600° C., the intent is to recite that the temperature can be any temperature within the range and, for example, can be equal to about 350° C., about 400° C., about 450° C., about 500° C., about 550° C., or about 600° C. Additionally, the temperature can be within any range from about 350° C. to about 600° C. (for example, the temperature can be in a range from about 400° C. to about 550° C.), and this also includes any combination of ranges between about 350° C. and about 600° C. Likewise, all other ranges disclosed herein should be interpreted in a manner similar to this example.

Although any methods, devices, and materials similar or equivalent to those described herein can be used in the practice or testing of the invention, the typical methods, devices, and materials are herein described.

All publications and patents mentioned herein are incorporated herein by reference for the purpose of describing and disclosing, for example, the constructs and methodologies that are described in the publications and patents, which might be used in connection with the presently described invention.

DETAILED DESCRIPTION OF THE INVENTION

The following detailed description refers to the accompanying drawings. Wherever possible, the same or similar reference numbers are used in the drawings and the following description to refer to the same or similar elements or features. While various embodiments of the invention are described, modifications, adaptations, and other implementations are possible. For example, substitutions, additions, or modifications can be made to the elements illustrated in the drawings, and the methods described herein can be modified by substituting, reordering, or adding stages to the disclosed methods. Accordingly, the following detailed description and its exemplary embodiments do not limit the scope of the invention.

As disclosed herein, the reactor vessels with a removable external heating system offer several advantages and benefits over existing reactor vessels containing an internal steam coil (i.e., within the reaction chamber). First, if repairs are needed with an internal steam coil, the reactor has to be shutdown and cleared of any reactor contents, including sulfur and $H_2S$, in order to prevent any harmful exposure. In contrast, the external heating system of the disclosed reactor vessels can contain a steam circuit, but the piping is outside of the reactor vessel, so access and repairs are much easier. Second, significant corrosion issues exist with an internal steam coil, and exotic metallurgy is often required. The environment inside the reaction chamber can cause significant corrosion due to sulfur and $H_2S$ at temperatures in excess of 400° C., so corrosion-resistant stainless steel alloys may be required in order to prevent frequent reactor shutdowns and repairs due to corrosion. However, stainless steel-based internal heating coils do not conduct heat well, due to poor thermal conductivity. In contrast, the external heating system of the disclosed reactor vessels does not require exotic metallurgy nor corrosion resistance; in fact, material/metal selection for piping used in the external heating system can be specifically designed for efficient heat transfer performance. Third, a reactor vessel with an internal steam coil is costly and difficult to fabricate due to the heating coil and related connections that must pass through the reactor walls. In contrast, the external heating system of the disclosed reactor vessels requires no additional fabrication concerns for the reactor vessel, other than inclusion (if desired) of simple attachment points on the exterior surface of the vessel to facilitate easy fastening of portions of the heating system. Fourth, temperature control with an internal heating coil can be problematic due to fouling or build-up on the coil surfaces (the cleaning of which may require a reactor shutdown) and due to the inability to prevent liquid sulfur solidification on the interior walls of the reaction chamber. In contrast, the external heating system of the disclosed reactor vessels provides heat directly to the reactor walls to prevent liquid sulfur solidification, and if any fouling or build-up concerns occur with the external heating system, the reactor vessel does not need to be opened or shutdown.

In addition, the disclosed reactor vessels with a removable external heating system offer benefits over comparable reactor vessels with a heating jacket or steam jacket surrounding the exterior surface. Due to the extreme temperature ranges encountered during production cycles (from start-up to steady-state production to shutdown), often spanning 500° C. or more, jacketed heating systems cannot withstand the thermal expansion and contraction of the reaction chamber (e.g., using stainless steel) and would fail accordingly. In contrast, the external heating system of the disclosed reactor vessels is capable of withstanding the thermal expansion and contraction of the reaction chamber (e.g., using stainless steel) encountered during production cycles over large temperature ranges. As would be recognized by those of skill in the art, additional advantages and benefits to the disclosed reactor vessels are readily apparent from this disclosure.

Hydrogen Sulfide Reactor Vessels

FIG. 1 illustrates an embodiment of a $H_2S$ reactor vessel 110 consistent with the present invention. While not being limited thereto, the $H_2S$ reactor vessel 110 is described herein as it pertains to its use in a Girdler process for non-catalytically producing $H_2S$ from sulfur and $H_2$, or alternatively, as it pertains to the reaction of methane and sulfur to produce $H_2S$ and $CS_2$. The $H_2S$ reactor vessel 110 in FIG. 1 can include a reaction chamber 115 having a reactor wall 105, an internal heating system 180, and a gas distributor 150. The reactor vessel 110 can further include a liquid sulfur inlet 120, a liquid sulfur outlet 160, a hydrogen-containing gas inlet 130 connected to the gas distributor 150, and a $H_2S$-rich gas outlet 170. The arrows in FIG. 1 illustrate typical flow paths or directions for the respective inlet/outlet streams. The $H_2S$ reactor vessel 110 is illustrated with liquid sulfur 140 present at the representative liquid sulfur level 145 shown in FIG. 1. The hydrogen-containing gas (e.g., methane, $H_2$, etc.) emitted from the gas distributor 150 is shown as gas bubbles 155 rising through the liquid sulfur 140. Above the internal heating system 180 and liquid sulfur level 145 is a quench column 190 that extends up to the liquid sulfur inlet 120 near the top of the $H_2S$ reactor vessel 110.

The reaction chamber 115, the reactor wall 105, and the quench column 190 in FIG. 1 generally can be cylindrical in shape, but other geometries and orientations can be employed. For instance, as an alternative to a circular cross-section (when viewed from above or below, such as from the gas outlet 170), the reaction chamber 115, the reactor wall 105, and the quench column 190 can have a rectangular, elliptical, or oval cross-section.

The reaction chamber 115, the reactor wall 105, the quench column 190, the gas distributor 150, and other surfaces within the $H_2S$ reactor vessel 110 can be constructed of any suitable metal material, the selection of which can depend upon the desired operating temperature, desired operating pressure, and inertness to the reactor contents (e.g., molten sulfur, $H_2$, gaseous $H_2S$), amongst other factors. Typical metal materials can include carbon steel, stainless steel, and the like. In some embodiments, stainless steel can be used for such components. Moreover, a coating or layer containing any suitable material, compound, alloy, or metal can be used on any reactor surface (e.g., the reaction chamber 115, the gas distributor 150) to provide resistance to chemical corrosion.

The $H_2S$ reactor vessel 110 and the reaction chamber 115 can be configured for operating temperatures of at least about 300° C. or at least about 400° C., and in some embodiments, temperatures falling within a range from about 300° C. to about 700° C., from about 350° C. to about 650° C., from about 400° C. to about 600° C., or from about 425° C. to about 675° C. Likewise, the reactor vessel 110 and the reaction chamber 115 generally can be configured for operating pressures of from about 2 to about 20 bars, from about 3 to about 15 bars, from about 5 to about 10 bars, from about 3 to about 8 bars, or from about 6 to about 9 bars.

While not shown in FIG. 1, the reaction chamber 115 in the $H_2S$ reactor vessel 110 can contain flow-affecting elements or baffles, which can be above the gas distributor 150 or the internal heating system 180 and below the liquid sulfur level 145 during continuous operation, and these can increase the contact time between the gas bubbles 155 (e.g., $H_2$ or methane) and the liquid sulfur 140. The gas distributor 150 can be of any design suitable for adding or emitting or injecting gas, such as a sparging pipe or device, or a plurality of nozzles. The gas inlet 130 and the gas distributor 150 generally can be configured for gas pressures ranging from about 25 to about 200 psig, from about 50 to about 150 psig, or from about 75 to about 125 psig.

Any suitable internal heating system 180 can be employed in the reactor vessel 110, so long as the system is capable of being used in a liquid sulfur environment and is capable of heating sulfur (and other reactor contents) to a temperature of at least about 300° C. or at least about 400° C., and maintaining typical operating temperatures ranging from about 300° C. to about 700° C., from about 350° C. to about 650° C., from about 400° C. to about 600° C., or from about 425° C. to about 675° C. Often, the internal heating system 180 is an electric heating system, and the system can contain an electrical resistance heating element, an electric heater tube bundle, as well as combinations thereof. In an embodiment of this invention, the reactor vessel does not contain another internal heating system other than the internal electrical heating system, for instance, the reactor vessel does not contain an internal steam coil heating apparatus. Additionally, in another embodiment, the reactor vessel does not contain a heating jacket or steam jacket on an exterior surface of the reactor vessel.

While not shown in FIG. 1, the quench column 190 can contain suitable packing material, i.e., packing material that is inert to the reactor contents. For example, the quench column can contain ceramic packing, Raschig rings, Pall rings, or similar materials. The quench column 190 generally is configured to maintain a quench column operating temperature above the melting point of sulfur, for instance, at least about 120° C. or at least about 130° C. Quench column operating temperatures often can fall within a range from about 120° C. to about 500° C., from about 125° C. to about 450° C., or from about 135° C. to about 400° C., where lower temperatures are present at the top of the column, and higher temperatures are present at the bottom of the column (and closer to the liquid sulfur 140).

Above the quench column 190 is the liquid sulfur inlet 120, in which the sulfur feed can be fresh liquid sulfur, recycled liquid sulfur, or a mixture thereof. Sulfur exiting the bottom of the reactor vessel 110 at the liquid sulfur outlet 160 can be connected with the liquid sulfur inlet 120, thereby forming a recycle or recirculation loop.

At the top of the $H_2S$ reactor vessel 110 is the $H_2S$-rich gas outlet 170. For the reaction of sulfur with $H_2$ gas, generally this gas stream is $H_2S$-rich, with minimal or trace amounts of $H_2$ gas and/or sulfur vapor. For the reaction of sulfur with methane, generally this gas stream is $H_2S$-rich, with a lesser amount of $CS_2$. In an embodiment of this invention, the $H_2S$-rich gas stream existing the gas outlet 170 can have a purity of at least about 75 wt. % $H_2S$, at least about 90 wt. % $H_2S$, at least about 95 wt. % $H_2S$, or at least about 98 wt. % $H_2S$. If desired, the $H_2S$-rich gas stream exiting the gas outlet 170 can be further processed and purified in a downstream separation system by removing at least a portion of the sulfur vapor (optionally, trace $H_2$ may be removed as well), or by removing at least a portion of the $CS_2$, using any suitable technique, such as condensation, distillation, or evaporation, as well as combination of these techniques.

Features, designs, and additional information on $H_2S$ reactor vessels that can be employed in the $H_2S$ reactor vessels with external heating systems described herein are disclosed in U.S. Pat. Nos. 2,214,859, 2,857,250, 2,863,725, and 2,876,071, and European publication EP 0339818, which are incorporated herein by reference in their entirety.

Figure 2:
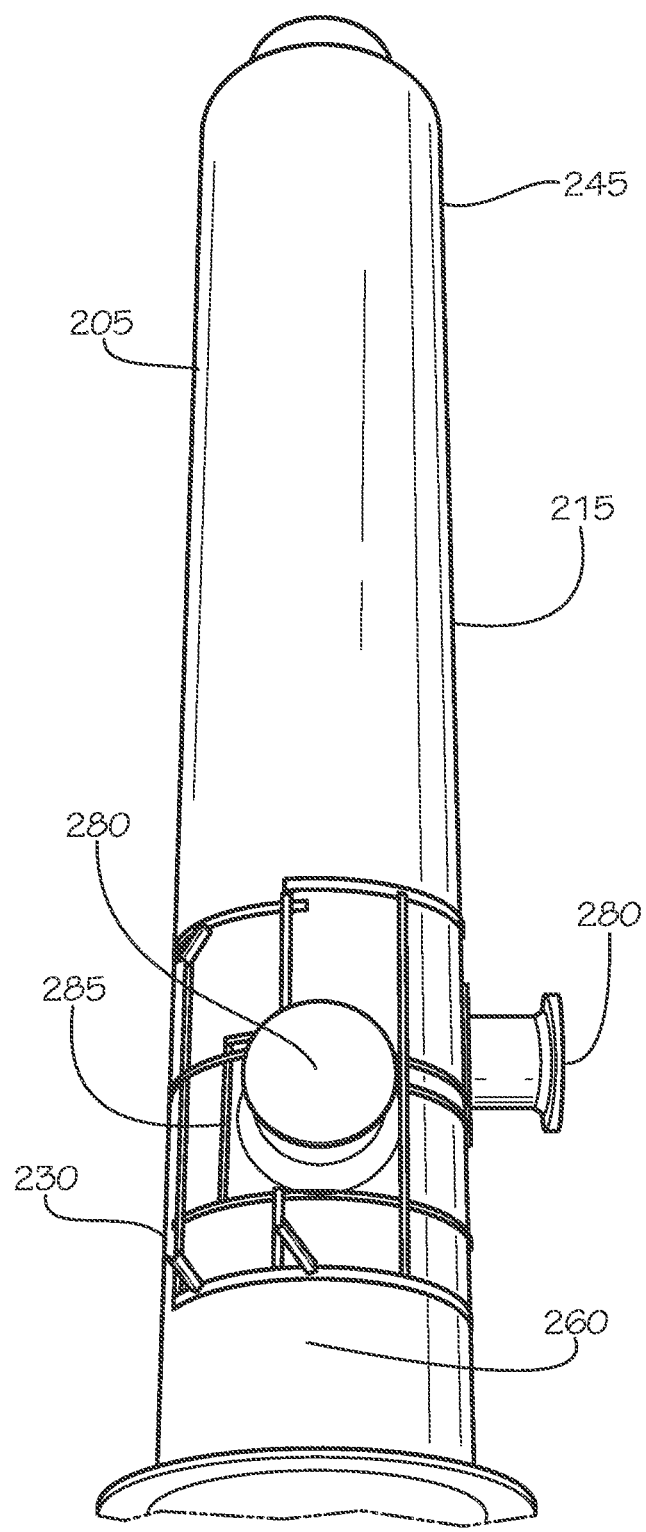
FIG. 2 is a front perspective view of the bottom section of the reactor vessel of FIG. 1, with a representative external heating system, with some parts omitted for clarity.

Referring now to FIG. 2, an exterior view of the bottom section of the reactor vessel of FIG. 1 is illustrated, showing a reaction chamber 215, a reactor wall 205, a liquid sulfur outlet 260, and a representative liquid sulfur level 245. The parts labeled as 280 represent the external connections to the internal heating system, e.g., internal electric heater tube bundles. Above the internal heating system (with external connections 280) and below the liquid sulfur level 245 can be flow-affecting elements or baffles, similar to that described hereinabove in relation to FIG. 1. A typical location for a hydrogen-containing gas inlet 230 for $H_2$ or methane, below the internal heating system, is shown in FIG. 2.

On the exterior of the reaction chamber 215 and reactor wall 205, and positioned generally above and below the internal heating system (with external connections 280) is a portion of an external heating system 285, discussed in greater detail hereinbelow.

Figure 3:
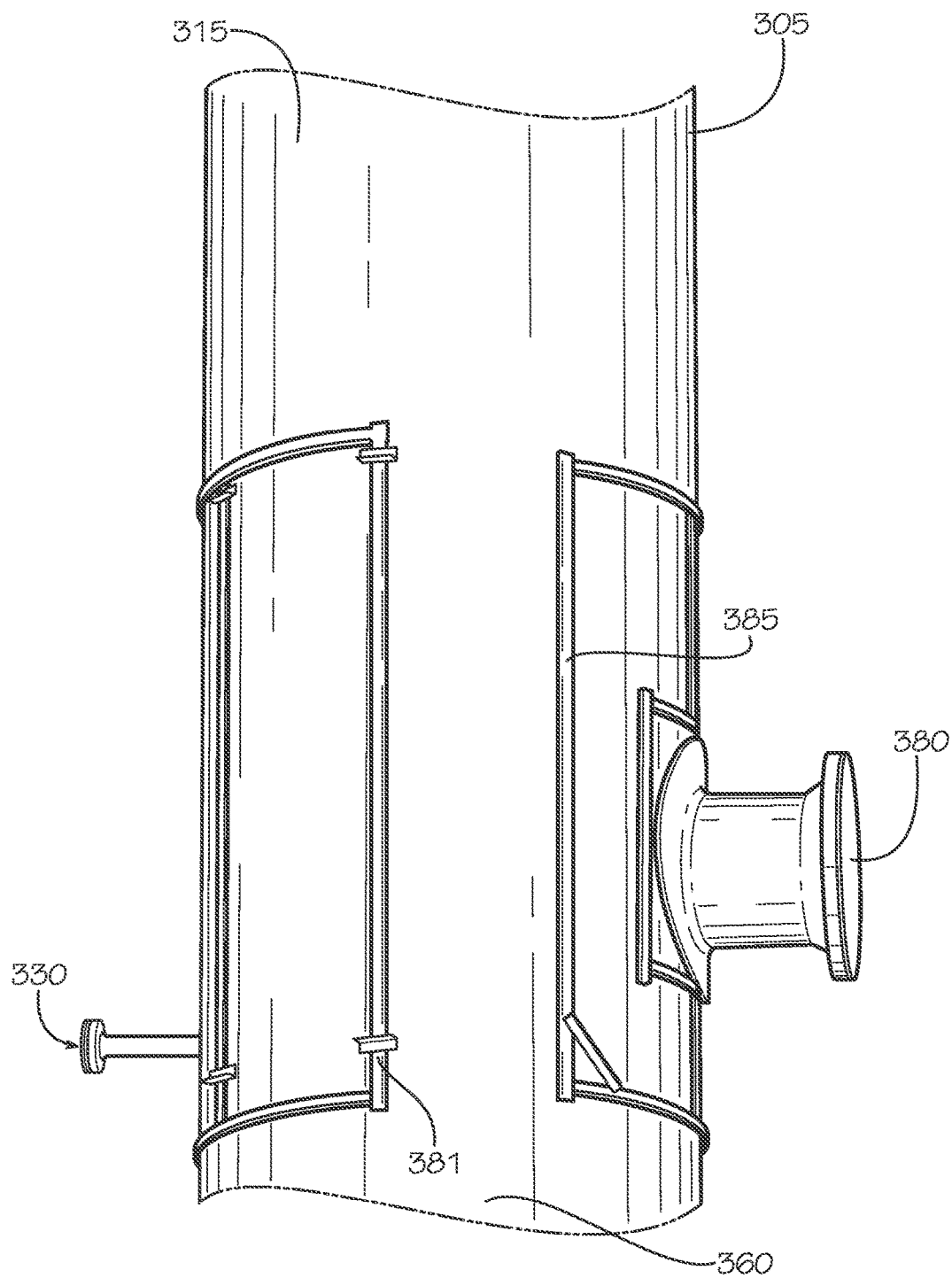
FIG. 3 is a close-up side perspective view of the bottom section of the reactor vessel of FIG. 1, with a representative external heating system, with some parts omitted for clarity.

Referring now to FIG. 3, a rotated exterior and close-up view of the bottom section of the reactor vessel of FIG. 1 is illustrated, showing a reaction chamber 315, a reactor wall 305, and a liquid sulfur outlet 360. The part labeled as 380 represents the external connection to the internal heating system, e.g., internal electric heater tube bundles. A hydrogen-containing gas inlet 330 for $H_2$ or methane, positioned below the internal heating system, is illustrated in FIG. 3.

On the exterior of the reaction chamber 315 and reactor wall 305, and positioned generally above and below the internal heating system (with external connection 380) is a portion of an external heating system 385 with a removable fastener 381, which are discussed in greater detail hereinbelow.

Figure 4:
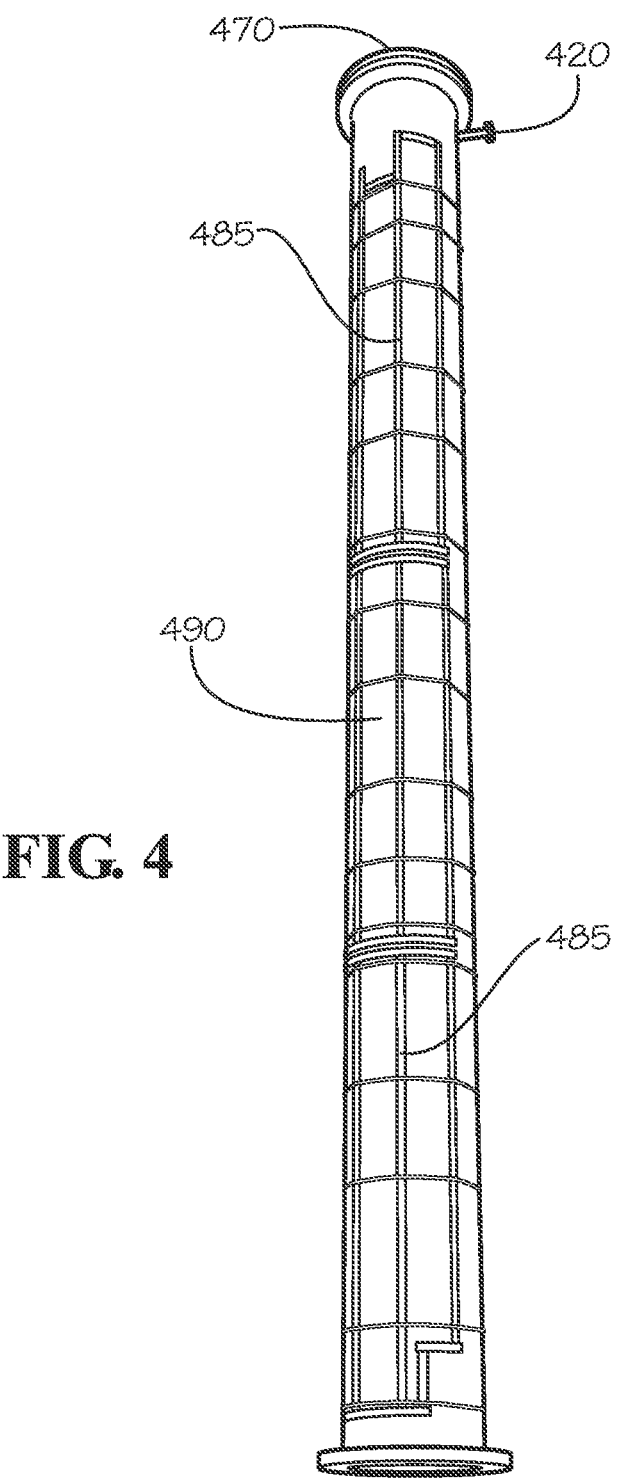
FIG. 4 is a front perspective view of the top section of the reactor vessel of FIG. 1, with a representative quench column and external heating system, with some parts omitted for clarity.

Referring now to FIG. 4, an exterior view of the top section of the reactor vessel of FIG. 1 is illustrated, showing a quench column 490, a liquid sulfur inlet 420, and a gas outlet 470. On the exterior of the quench column 490 are portions of an external heating system 485, discussed in greater detail hereinbelow.

Figure 5:
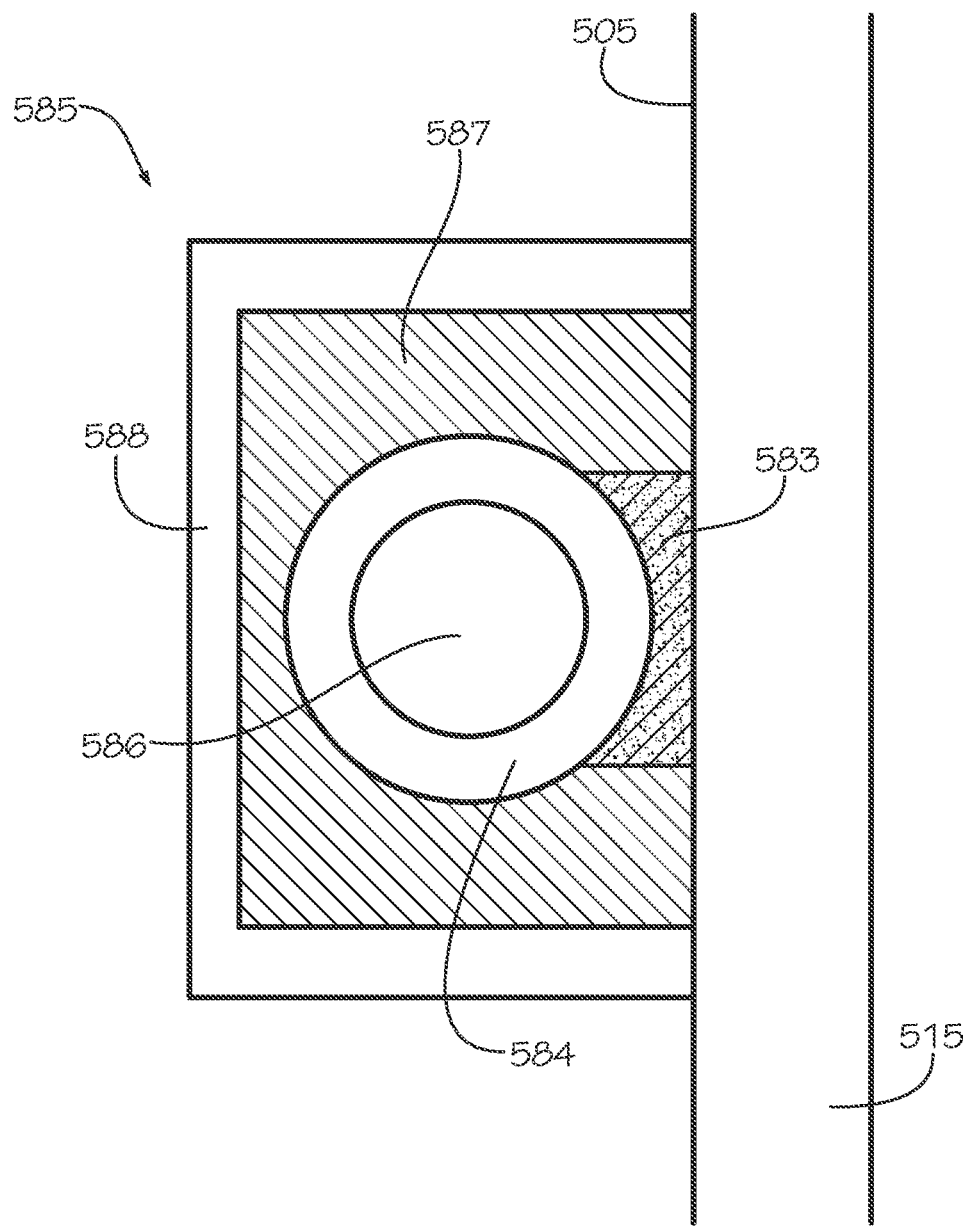
FIG. 5 is a close-up cross-sectional view of a portion of the external heating system illustrated in FIGS. 2-4.

FIG. 5 presents a close-up cross-sectional view of a portion of the external heating system generally represented in FIGS. 2-4. In FIG. 5, an exterior heating system 585 is adjacent an exterior surface of the reactor wall 505 of the reaction chamber 515. While not limited thereto, the exterior heating system 585 can include a heat transfer fluid 586 contained within any suitable conduit, such as a pipe 584, which is conductively (but removably) attached to the reactor wall 505 with a heat transfer cement 583 or other similar material, such that heat from the heat transfer fluid 586 can flow to the reactor wall 505 and heat or maintain the temperature of contents within the reaction chamber 515. As shown in FIG. 5, sections of the conduit or pipe 584 that do not generally face the reactor wall 505 can be surrounded by insulation 587. An outer cover or plating 588 can cover the pipe 584, and can be removable attached and/or banded to the reactor wall 505.

Consistent with embodiments of this invention (e.g., see FIGS. 2-3), the external heating system can comprise a heated reactor conduit conductively and removably attached to a portion of an exterior surface of the reactor wall, wherein at least a portion of the heated reactor conduit is positioned in close proximity to the internal heating system and is configured to maintain a start-up temperature of the liquid sulfur above the melting point of sulfur at least until a level of the liquid sulfur in the reaction chamber is above the internal heating system. Generally, the external heating system (and/or the heated reactor conduit) can be configured to maintain the temperature of the liquid sulfur of at least about 120° C., or at least about 130° C., and typically in a range from about 120° C. to about 200° C., from about 130° C. to about 175° C., or from about 125° C. to about 150° C.

Additionally, the external heating system (see e.g., FIG. 4) can further comprise a heated column conduit conductively and removably attached to a portion of an exterior surface of the quench column, wherein the heated column conduit is configured to maintain a quench column operating temperature of the liquid sulfur in the quench column above the melting point of sulfur. The quench column operating temperature is above the melting point of sulfur, and often greater than equal to about 120° C., or greater than or equal to about 130° C. Illustrative ranges for the quench column operating temperature include from about 120° C. to about 500° C., from about 125° C. to about 450° C., or from about 135° C. to about 400° C., where lower temperatures are present at the top of the column, and higher temperatures are present at the bottom of the column (and closer to the liquid sulfur in the reaction chamber).

The heated reactor conduit and the heated column conduit, independently, can be of any suitable geometric shape (or cross-section), such as generally cylindrical, a tube, or a pipe, although other geometries and orientations can be employed. A pipe 584 is illustrated in FIG. 5 as the conduit. Independently, each conduit can comprise or can be constructed of any suitable metal or conductive material, non-limiting examples of which can include carbon steel, stainless steel, aluminum, copper, and the like, and well as combinations of more than one of these materials. Again referring to FIG. 5, within the conduit (e.g., pipe 584), any suitable heat transfer fluid 586, such as water or steam, can be circulated. To achieve the desired start-up and quench column operating temperatures above the melting point of sulfur, steam is typically circulated with the respective conduits.

As shown in FIGS. 2-4, each conduit can comprise vertical sections oriented substantially in the vertical direction; additionally or alternatively, each conduit can comprise horizontal sections oriented substantially in the horizontal direction. Regarding the horizontal sections, these sections can be arcuately shaped, for instance, to traverse exterior surfaces that are generally circular in shape. As discussed herein, the reaction chamber, the reactor wall, and the quench column can be generally cylindrical in shape.

Although not limited thereto, the external heating system can comprise from 1 to 4 heated reactor conduits (also referred to as heating circuits or steam circuits). For instance, as can be envisioned in FIGS. 2-3, the external heating system 285/385 can contain one contiguous heated reactor conduit with vertical and horizontal sections and appropriate bends/elbows therebetween, such that it traverses the reactor wall 205/305 in close proximity (above and below) the internal heating system 280/380. Thus, it is possible for the external heating system to contain only 1 heated reactor conduit (one heating circuit or steam circuit). As would be recognized by one of skill in the art, 2 or more heated reactor conduits can be used, as needed, for the reaction chamber containing liquid sulfur.

Likewise, although not limited thereto, the external heating system can comprise from 1 to 4 heated column conduits (again, also referred to as heating circuits or steam circuits). For instance, as can be envisioned in FIG. 4, the external heating system 485 can contain three separate heated column conduits, due to the sheer size of the quench column 490, although more or less contiguous conduits can be used as needed. Each heated conduit can have vertical and horizontal sections and appropriate bends/elbows therebetween, such that it traverses the quench column as illustrated representatively in FIG. 4.

As shown in the FIG. 5, a suitable heat transfer material, such as a heat transfer cement 583, often a non-drying heat transfer cement, can be present between the conduit (pipe 584) and the exterior surface of the reactor wall 505. Typically, this can be used to minimize air gaps and promote efficient heat transfer into the reactor vessel, but does not permanently affix the conduit to the reactor vessel, i.e., it is conductively and removably attached. Additionally, the external heating system can further comprise insulation 587 adjacent at least a portion of the conduit, typically adjacent conduit surfaces that face away from the reactor vessel. Moreover, the external heating system can further comprise any suitable cover or plating 588 over the conduit (the heated reactor conduit, the heated column conduit), as well as over the insulation and heat transfer material/cement, if used. The cover or plating can be stainless steel, and can be configured to support the conduit and be removably attached to the exterior surface of the reactor vessel. In FIGS. 2-4, it is the cover or plating of the external heating system 285/385/485 that is externally visible in these illustrations. The conduit/pipe, insulation, and heat transfer material/cement are underneath the cover or plating in FIGS. 2-4, and their spatial relationship is represented in FIG. 5.

The external heating system (and/or the cover, and/or the conduit) can be removably supported about the respective exterior surface of the reactor vessel with any suitable removable fastener known to those of skill in the art, non-limiting examples of which can include bolts, screws, metal bands, and the like, as well as combinations thereof. In FIG. 3, illustrated is a removable fastener 381 that supports the external heating system (inclusive of the cover and the conduit) about the exterior surface of the reactor wall 305 and reaction chamber 315.

To facilitate ease of fastening, the exterior surface of the reactor vessel can further comprise any suitable attachment point known to those of skill in the art, non-limiting examples of which can include protrusions, knobs, brackets, and the like, as well as combinations thereof. The attachment point can facilitate the removable connection (bolting onto, screwing onto, and the like) of the external heating system (and/or the cover, and/or the conduit) onto the reactor vessel.

Beneficially, FIGS. 2-4 demonstrate that the heated reactor conduit and the heated column conduit represent only a small fraction of the exterior surfaces of the reactor vessel. Thus, the external heating system does not completely envelop vertical/horizontal exterior surfaces of the reactor vessel. For instance, the heated reactor conduit (and/or the heated column conduit) can be positioned on less than about 33% of the surface area of the exterior surface of the reactor wall (and/or the exterior surface of the quench column), and in some embodiments, less than about 25% of the surface area, less than about 20% of the surface area, less than about 10% of the surface area, or less than about 5% of the surface area.

Also beneficially, the external heating system (and/or each heated conduit) is capable of withstanding the thermal expansion and contraction of stainless steel (e.g., used in the reaction chamber, reactor wall, and quench column) over an extremely robust temperature range, where temperature ranges can span at least about 300° C., at least about 350° C., at least about 400° C., or at least about 500° C. In an embodiment, for example, the external heating system (and/or each heated conduit) is capable of withstanding the thermal expansion and contraction of stainless steel over a temperature range from a first temperature of about 25° C. to a second temperature of about 650° C.; alternatively, from a first temperature of about 25° C. to a second temperature of about 500° C.; alternatively, from a first temperature of about 125° C. to a second temperature of about 675° C.; or alternatively, from a first temperature of about 125° C. to a second temperature of about 525° C.

While the design or layout of the external heating system (and/or the cover) is not altogether limiting, other than not covering the entirety of the horizontal exterior surface or vertical exterior surface, the design or layout depicted herein often can be described as a cage-like appearance, a grid-like appearance, a frame-like appearance, or a lattice-like appearance, among other descriptions.

Hydrogen Sulfide Production Processes

Embodiments of this invention also are directed to $H_2S$ production processes. Such processes can comprise, consist essentially of, or consist of (i) controlling a reaction chamber containing liquid sulfur at a start-up temperature above the melting point of sulfur with an external heating system comprising a heated reactor conduit conductively and removably attached to an exterior surface of the reaction chamber; (ii) adding liquid sulfur to the reaction chamber to a level sufficient to immerse an internal heating system positioned within the reaction chamber; (iii) engaging the internal heating system to reach and maintain an operating temperature of the liquid sulfur of at least about 300° C. (e.g., ranging from 425 to 525° C.); (iv) adding a hydrogen-containing gas into the liquid sulfur and reacting to produce $H_2S$; and (v) optionally, discontinuing the operation of the external heating system. Generally, the features of these processes (e.g., the start-up temperature, the external heating system, the internal heating system, the operating temperature, and the hydrogen-containing gas, among others) are independently described herein and these features can be combined in any combination to further describe the disclosed $H_2S$ production processes. Moreover, other process steps can be conducted before, during, and/or after any of the steps listed in the disclosed processes, unless stated otherwise.

In one embodiment of this invention, the $H_2S$ production process can be a process to produce $H_2S$ from sulfur and $H_2$ gas (the hydrogen-containing gas), such as the Girdler process. In another embodiment, the $H_2S$ production process can be a process to produce $H_2S$ (and $CS_2$) from sulfur and methane (the hydrogen-containing gas). In these and other embodiments, the process can include a catalyst or, alternatively, the process does not include a catalyst.

Consistent with embodiments disclosed herein, step (i) of the process relates to controlling a reaction chamber containing liquid sulfur at a start-up temperature above the melting point of sulfur with an external heating system comprising a heated reactor conduit conductively and removably attached to an exterior surface of the reaction chamber. The standard melt point of sulfur is approximately 115.2° C. Therefore, the reaction chamber containing liquid sulfur can be controlled at a start-up temperature of at least about 116° C., at least about 120° C., or at least about 130° C. Often, the start-up temperature can be in a range from about 120° C. to about 200° C., from about 130° C. to about 200° C., from about 130° C. to about 175° C., or from about 125° C. to about 150° C.

In step (ii), liquid sulfur is added to the reaction chamber to a level sufficient to immerse the internal heating system positioned within the reaction chamber (see FIG. 1). It is customary practice to engage the internal heating system only after the heating system is fully immersed in the liquid sulfur.

The internal heating system is engaged in step (iii) to reach and maintain an operating temperature of the liquid sulfur of at least about 300° C., or at least about 400° C. Often, the operating temperature during steady-state operation can range from about 300° C. to about 700° C., from about 350° C. to about 600° C., from about 400° C. to about 600° C., from about 425° C. to about 675° C., or from about 425° C. to about 550° C. While not being limited thereto, typical steady-state operating pressures can fall within a range from about 2 to about 20 bars, from about 3 to about 15 bars, from about 5 to about 10 bars, from about 3 to about 8 bars, or from about 6 to about 9 bars.

The internal heating system in step (iii) is described hereinabove, and can be any suitable internal electric heating system comprising, for instance, an electrical resistance heating element, an electric heater tube bundle, or combinations thereof. Generally, the process does not require or employ an internal steam coil heating apparatus or a heating jacket or steam jacket on the exterior surface of the reaction chamber.

In step (iv), the hydrogen-containing gas—such as methane or $H_2$, and the like—is added or injected into the liquid sulfur, and reacted to produce $H_2S$. Any suitable hydrogen-containing gas pressure can be used. Illustrative and non-limiting pressure ranges include from about 25 to about 200 psig, from about 50 to about 150 psig, or from about 75 to about 125 psig.

The processes of this invention generally are capable of producing $H_2S$ having a purity of at least about 75 wt. % $H_2S$, and in some embodiments, at least about 90 wt. % $H_2S$, at least about 95 wt. % $H_2S$, or at least about 98 wt. % $H_2S$. Moreover, the process can further comprise a step of isolating/purifying the $H_2S$ by removing at least a portion of $CS_2$ (e.g., if methane is a reactant), and/or at least a portion of $H_2$ (e.g., if needed, and if $H_2$ is a reactant), and/or at least a portion of sulfur vapor, from the $H_2S$. This can be accomplished using any suitable, including condensation, distillation, or evaporation, as well as combinations of more than one of these techniques.

In step (v), the operation of the external heating system, which is described in detail hereinabove, can be discontinued. Generally, once the internal heating system is fully engaged at the desired operating temperature, it is not necessary to continue the use of the external heating system. Therefore, in such circumstances, the operation of the external heating system is discontinued.

The invention is described above with reference to numerous aspects and embodiments, and specific examples. Many variations will suggest themselves to those skilled in the art in light of the above detailed description. All such obvious variations are within the full intended scope of the appended claims. Other embodiments of the invention can include, but are not limited to, the following (embodiments are described as "comprising" but, alternatively, can "consist essentially of" or "consist of"):

Embodiment 1

A $H_2S$ reactor vessel comprising:

(a) a reaction chamber comprising a reactor wall, the reaction chamber configured to contain liquid sulfur;

(b) a reactor inlet for liquid sulfur, the reactor inlet positioned at an upper portion of the reactor vessel;

(c) a reactor outlet for liquid sulfur, the reactor outlet positioned at a lower portion of the reactor vessel;

(d) a gas inlet for a hydrogen-containing gas, the gas inlet connected to a gas distributor, the gas distributor positioned above the reactor outlet for liquid sulfur and configured to inject the hydrogen-containing gas into the liquid sulfur in the reaction chamber;

(e) a gas outlet for a $H_2S$-rich gas stream, the gas outlet positioned above the reactor inlet;

(f) an internal heating system, the internal heating system positioned in the liquid sulfur in the reaction chamber during continuous operation of the reactor vessel and configured to maintain an operating temperature above the melting point of sulfur; and (g) an external heating system comprising a heated reactor conduit (one or a plurality of heated reactor conduits) conductively and removably attached to a portion of an exterior surface of the reactor wall, wherein at least a portion of the heated reactor conduit is positioned in close proximity to the internal heating system and is configured to maintain a start-up temperature of the liquid sulfur above the melting point of sulfur at least until a level of the liquid sulfur in the reaction chamber is above the internal heating system.

Embodiment 2

The vessel defined in embodiment 1, wherein the reactor vessel (and/or the reaction chamber) is configured for an operating temperature in any suitable range or in any range disclosed herein, e.g., at least about 300° C., at least about 400° C., from about 300° C. to about 700° C., from about 350° C. to about 650° C., from about 400° C. to about 600° C., or from about 425° C. to about 675° C.

Embodiment 3

The vessel defined in embodiment 1 or 2, wherein the reactor vessel (and/or the reaction chamber) is configured for an operating pressure in any suitable range or in any range disclosed herein, e.g., from about 2 to about 20 bars, from about 3 to about 15 bars, from about 3 to about 8 bars, or from about 6 to about 9 bars.

Embodiment 4

The vessel defined in any one of the preceding embodiments, wherein the reactor inlet is configured for fresh liquid sulfur, recycled liquid sulfur, or a mixture thereof.

Embodiment 5

The vessel defined in any one of the preceding embodiments, wherein the reactor inlet and the reactor outlet are connected to form a recycle loop for liquid sulfur.

Embodiment 6

The vessel defined in any one of the preceding embodiments, wherein the gas inlet (and/or the gas distributor) is configured for any suitable hydrogen-containing gas (e.g., methane, $H_2$, etc.) at a pressure in any suitable range or in any range disclosed herein, e.g., from about 25 to about 200 psig, from about 50 to about 150 psig, or from about 75 to about 125 psig.

Embodiment 7

The vessel defined in any one of the preceding embodiments, wherein the gas distributor comprises any suitable gas distributor or any gas distributor disclosed herein, e.g., a plurality of nozzles, or a sparging pipe or device.

Embodiment 8

The vessel defined in any one of the preceding embodiments, wherein the $H_2S$-rich gas stream comprises $H_2S$, $H_2$, and sulfur vapor or comprises $H_2S$ and $CS_2$.

Embodiment 9

The vessel defined in any one of the preceding embodiments, wherein the reactor vessel (and/or the gas outlet) is configured to provide a $H_2S$-rich gas stream having a purity of at least about 75 wt. % $H_2S$, at least about 90 wt. % $H_2S$, at least about 95 wt. % $H_2S$, or at least about 98 wt. % $H_2S$.

Embodiment 10

The vessel defined in any one of the preceding embodiments, further comprising a downstream separation system connected to the gas outlet, the downstream separation system configured to purify the $H_2S$-rich gas stream by removing at least a portion of the sulfur vapor using any suitable technique or any technique disclosed herein, e.g., condensation, distillation, or evaporation, as well as combinations thereof.

Embodiment 11

The vessel defined in any one of the preceding embodiments, wherein the reaction chamber further comprises flow-affecting elements (e.g., baffles) to increase contact between the hydrogen-containing gas and the liquid sulfur, and the flow-affecting elements can be positioned in any suitable location (e.g., above the gas distributor and below the level of the liquid sulfur during continuous operation).

Embodiment 12

The vessel defined in any one of the preceding embodiments, wherein the reactor vessel (and/or the reaction chamber) is configured to produce $H_2S$ from $H_2$ gas and liquid sulfur (e.g., the Girdler process) and/or to produce $H_2S$ from methane and sulfur.

Embodiment 13

The vessel defined in any one of the preceding embodiments, wherein the reactor vessel (and/or the reaction chamber) does not contain a catalyst.

Embodiment 14

The vessel defined in any one of the preceding embodiments, wherein the internal heating system is further configured to heat sulfur from at or near the melting point of sulfur to an operating temperature (and maintain the operating temperature) in any suitable range or in any range disclosed herein, e.g., at least about 300° C., at least about 400° C., from about 300° C. to about 700° C., from about 350° C. to about 650° C., from about 400° C. to about 600° C., or from about 425° C. to about 675° C.

Embodiment 15

The vessel defined in any one of the preceding embodiments, wherein the internal heating system is any suitable electric heating system or any electric heating system disclosed herein, e.g., an electrical resistance heating element, an electric heater tube bundle, or a combination thereof.

Embodiment 16

The vessel defined in any one of the preceding embodiments, wherein the reactor vessel does not contain another internal heating system other than the internal electrical heating system, e.g., the reactor vessel does not contain an internal steam coil heating apparatus.

Embodiment 17

The vessel defined in any one of the preceding embodiments, wherein the reactor vessel does not contain a heating jacket or steam jacket on an exterior surface of the reactor vessel.

Embodiment 18

The vessel defined in any one of the preceding embodiments, wherein the reactor vessel further comprises a quench column positioned above the internal heating system (and/or the level of the liquid sulfur) and below the reactor inlet for liquid sulfur.

Embodiment 19

The vessel defined in embodiment 18, wherein the quench column is configured to maintain a quench column operating temperature above the melting point of sulfur, and the quench column operating temperature is in any suitable range or in any range disclosed herein, e.g., at least about 120° C., at least about 130° C., from about 120° C. to about 500° C., from about 125° C. to about 450° C., or from about 135° C. to about 400° C.

Embodiment 20

The vessel defined in embodiment 18 or 19, wherein the quench column contains any suitable inert packing material or any inert packing material disclosed herein, e.g., ceramic packing, Raschig rings, or Pall Rings, as well as combinations thereof.

Embodiment 21

The vessel defined in any one of the preceding embodiments, wherein the reaction chamber (and/or the quench column) has a generally cylindrical shape.

Embodiment 22

The vessel defined in any one of the preceding embodiments, wherein the reactor vessel (and/or the reaction chamber, and/or the reactor wall, and/or the quench column) comprises (or is constructed of) any suitable metal material, or any metal material disclosed herein, e.g., stainless steel.

Embodiment 23

The vessel defined in any one of the preceding embodiments, wherein the reactor vessel (and/or the reaction chamber, and/or the reactor wall, and/or the quench column)

comprises a coating/layer comprising any suitable material that provides resistance to corrosion.

Embodiment 24

The vessel defined in any one of the preceding embodiments, wherein the external heating system (and/or the reactor conduit) is configured to maintain a start-up temperature of the liquid sulfur in any suitable range or in any range disclosed herein, e.g., at least about 120° C., at least about 130° C., from about 120° C. to about 200° C., from about 130° C. to about 175° C., or from about 125° C. to about 150° C.

Embodiment 25

The vessel defined in any one of the preceding embodiments, wherein the external heating system further comprises a heated column conduit conductively and removably attached to at least a portion of an exterior surface of the quench column, wherein the heated column conduit is configured to maintain a quench column operating temperature of the liquid sulfur in the quench column above the melting point of sulfur.

Embodiment 26

The vessel defined in embodiment 25, wherein the quench column operating temperature is above the melting point of sulfur, and the quench column operating temperature is in any suitable range or in any range disclosed herein, e.g., at least about 120° C., at least about 130° C., from about 120° C. to about 500° C., from about 125° C. to about 450° C., or from about 135° C. to about 400° C.

Embodiment 27

The vessel defined in any one of the preceding embodiments, wherein each conduit is of any suitable geometric shape (or cross-section) or any geometric shape (or cross-section) disclosed herein, e.g., generally cylindrical, a tube, or a pipe.

Embodiment 28

The vessel defined in any one of the preceding embodiments, wherein each conduit comprises (or is constructed of) any suitable conductive material, or any conductive material disclosed herein, e.g., carbon steel, stainless steel, aluminum, copper, or combinations thereof.

Embodiment 29

The vessel defined in any one of the preceding embodiments, wherein any suitable heat transfer fluid or any heat transfer fluid disclosed herein (e.g., water or steam) is circulated in each conduit.

Embodiment 30

The vessel defined in any one of the preceding embodiments, wherein each conduit comprises vertical sections oriented substantially in the vertical direction.

Embodiment 31

The vessel defined in any one of the preceding embodiments, wherein each conduit comprises horizontal sections oriented substantially in the horizontal direction.

Embodiment 32

The vessel defined in embodiment 31, wherein the horizontal sections are arcuately shaped, e.g., to traverse exterior surfaces that are generally circular in shape.

Embodiment 33

The vessel defined in any one of the preceding embodiments, wherein the external heating system comprises from 1 to 4 heated reactor conduits and/or from 1 to 4 heated column conduits.

Embodiment 34

The vessel defined in any one of the preceding embodiments, wherein any suitable heat transfer material or any heat transfer material disclosed herein (e.g., a heat transfer cement, non-drying) is present between each conduit and the exterior surface to minimize air gaps and promote efficient heat transfer.

Embodiment 35

The vessel defined in any one of the preceding embodiments, wherein the external heating system (and/or each heated conduit) is capable of withstanding the thermal expansion and contraction of stainless steel (e.g., reaction chamber or reactor wall) over any suitable temperature range or any range disclosed herein, e.g., a temperature range of at least about 300° C., or at least about 350° C.; from a first temperature of about 25° C. to a second temperature of about 650° C., from a first temperature of about 25° C. to a second temperature of about 500° C., from a first temperature of about 125° C. to a second temperature of about 675° C., or from a first temperature of about 125° C. to a second temperature of about 525° C.

Embodiment 36

The vessel defined in any one of the preceding embodiments, wherein the heated reactor conduit (and/or the heated column conduit) is positioned on a minor fraction of the exterior surface of the reactor wall (and/or the exterior surface of the quench column), e.g., less than about 33% of the surface area, less than about 25% of the surface area, less than about 20% of the surface area, less than about 10% of the surface area, or less than about 5% of the surface area.

Embodiment 37

The vessel defined in any one of the preceding embodiments, wherein the external heating system further comprises insulation adjacent at least a portion of each conduit facing away from the exterior surface.

Embodiment 38

The vessel defined in any one of the preceding embodiments, wherein the external heating system further comprising any suitable cover over the heated reactor conduit and/or the heated column conduit (and/or the insulation, and/or the heat transfer material) or any cover disclosed herein, e.g., a stainless steel cover, the cover configured to be removably attached to the exterior surface of the reactor vessel.

Embodiment 39

The vessel defined in any one of the preceding embodiments, wherein the external heating system (and/or the cover, and/or the conduit) is removably supported about the exterior surface with any suitable removable fastener or any removable fastener disclosed herein, e.g., a bolt, a screw, a metal band, or combinations thereof.

Embodiment 40

The vessel defined in any one of the preceding embodiments, wherein the exterior surface has any suitable attachment point or any attachment point disclosed herein (e.g., a protrusion, a knob, a bracket, or combinations thereof) to facilitate the removable connection (bolting onto, screwing onto, and the like) of the external heating system (and/or the cover, and/or the conduit).

Embodiment 41

The vessel defined in any one of the preceding embodiments, wherein the external heating system (and/or the cover) comprises any suitable design or layout that does not cover the entirety of the exterior horizontal surface or the exterior vertical surface, or any design or layout disclosed herein, e.g., a cage-like appearance, a grid-like appearance, a frame-like appearance, or a lattice-like appearance.

Embodiment 42

A $H_2S$ production process comprising:
(i) controlling a reaction chamber containing liquid sulfur at a start-up temperature above the melting point of sulfur with an external heating system comprising a heated reactor conduit conductively and removably attached to an exterior surface of the reaction chamber;
(ii) adding liquid sulfur to the reaction chamber to a level sufficient to immerse an internal heating system positioned within the reaction chamber;
(iii) engaging the internal heating system to reach and maintain an operating temperature of the liquid sulfur of at least about 300° C.;
(iv) adding a hydrogen-containing gas into the liquid sulfur and reacting to produce $H_2S$; and
(v) optionally, discontinuing the operation of the external heating system.

Embodiment 43

The process defined in embodiment 42, wherein the operating temperature is in any suitable range or in any range disclosed herein, e.g., at least about 400° C., from about 300° C. to about 700° C., from about 350° C. to about 600° C., from about 400° C. to about 600° C., or from about 425° C. to about 675° C.

Embodiment 44

The process defined in embodiment 42 or 43, wherein the start-up temperature is in any suitable range or in any range disclosed herein, e.g., at least about 116° C., at least about 120° C., from about 120° C. to about 200° C., from about 130° C. to about 200° C., from about 130° C. to about 175° C., or from about 125° C. to about 150° C.

Embodiment 45

The process defined in any one of embodiments 42-44, wherein the reacting in step (iv) is conducted at an operating pressure in any suitable range or in any range disclosed herein, e.g., from about 2 to about 20 bars, from about 3 to about 15 bars, from about 3 to about 8 bars, or from about 6 to about 9 bars.

Embodiment 46

The process defined in any one of embodiments 42-45, wherein the adding in step (iv) is conducted with a hydrogen-containing gas (e.g., methane, $H_2$, etc.) at a gas pressure in any suitable range or in any range disclosed herein, e.g., from about 25 to about 200 psig, from about 50 to about 150 psig, or from about 75 to about 125 psig.

Embodiment 47

The process defined in any one of embodiments 42-46, wherein $H_2S$ is produced at a purity of at least about 75 wt. % $H_2S$, at least about 90 wt. % $H_2S$, at least about 95 wt. % $H_2S$, or at least about 98 wt. % $H_2S$.

Embodiment 48

The process defined in any one of embodiments 42-47, further comprising a step of isolating/purifying the $H_2S$ by removing at least a portion of $CS_2$, and/or at least a portion of $H_2$ and/or at least a portion of sulfur vapor, from the $H_2S$ using any suitable technique or any technique disclosed herein, e.g., condensation, distillation, or evaporation, as well as combinations thereof.

Embodiment 49

The process defined in any one of embodiments 42-48, wherein the process does not include a catalyst.

Embodiment 50

The process defined in any one of embodiments 42-49, wherein the internal heating system is any suitable electric heating system or any electric heating system disclosed herein, e.g., an electrical resistance heating element, an electric heater tube bundle, or a combination thereof.

Embodiment 51

The process defined in any one of embodiments 42-50, wherein the process does not employ an internal steam coil heating apparatus or a heating jacket or steam jacket on the exterior surface of the reaction chamber.

Embodiment 52

The process defined in any one of embodiments 42-51, wherein the process comprises discontinuing the operation of the external heating system in step (v).

Embodiment 53

The process defined in any one of embodiments 42-52, wherein the external heating system (and/or each heated conduit) is further defined in any one of embodiments 24-41.

We claim:

1. A H$_2$S production process comprising:
   (i) controlling a reaction chamber containing liquid sulfur at a start-up temperature above the melting point of sulfur with an external heating system comprising a heated reactor conduit conductively and removably attached to an exterior surface of the reaction chamber;
   (ii) adding liquid sulfur to the reaction chamber to a level sufficient to immerse an internal heating system positioned within the reaction chamber;
   (iii) engaging the internal heating system to reach and maintain an operating temperature of the liquid sulfur of at least about 300° C.;
   (iv) adding a hydrogen-containing gas into the liquid sulfur and reacting to produce H$_2$S; and
   (v) optionally, discontinuing the operation of the external heating system.

2. The process of claim 1, wherein:
   the start-up temperature is at least about 120° C.;
   the operating temperature is in a range from about 350° C. to about 600° C.; and
   the hydrogen-containing gas comprises H$_2$.

3. The process of claim 1, wherein the process comprises discontinuing the operation of the external heating system in step (v).

4. The process of claim 1, wherein:
   the process does not include a catalyst; and
   the process does not employ an internal steam coil heating apparatus or a heating jacket or steam jacket on the exterior surface of the reaction chamber.

5. The process of claim 1, further comprising a step of purifying the H$_2$S by removing at least a portion of CS$_2$, and/or at least a portion of H$_2$, and/or at least a portion of sulfur vapor, from the H$_2$S.

6. The process of claim 5, wherein H$_2$S is produced at a purity of at least about 95 wt. % H$_2$S.

7. The process of claim 1, wherein:
   the start-up temperature is in a range from about 120° C. to about 200° C.; and
   the operating temperature is in a range from about 400° C. to about 600° C.

8. The process of claim 7, wherein the reacting in step (iv) is conducted at an operating pressure in a range from about 3 to about 15 bars.

9. The process of claim 1, wherein the internal heating system is an electric heating system.

10. The process of claim 1, further comprising a step of operating a quench column positioned above the internal heating system and below a reactor inlet for adding the liquid sulfur to the reaction chamber; and
    controlling a quench column operating temperature of the liquid sulfur in the quench column above the melting point of sulfur with the external heating system, wherein the external heating system further comprises a heated column conduit conductively and removably attached to at least a portion of an exterior surface of the quench column.

11. The process of claim 10, wherein the quench column operating temperature is in a range from about 125° C. to about 450° C.

12. The process of claim 10, wherein the heated column conduit is present on less than about 20% of the surface area of the exterior surface of the quench column.

13. The process of claim 10, wherein the heated column conduit comprises steam circulating through a pipe constructed of a conductive metal material.

14. The process of claim 10, wherein a heat transfer material is present between the heated column conduit and the exterior surface of the quench column.

15. The process of claim 10, wherein:
    the external heating system comprises a cover over the heated column conduit, the cover configured to be removably attached to the exterior surface of the quench column; and
    the exterior surface of the quench column further comprises an attachment point configured for the removable attachment of the cover.

16. The process of claim 1, wherein the heated reactor conduit comprises steam circulating through a pipe constructed of a conductive metal material.

17. The process of claim 1, wherein a heat transfer material is present between the heated reactor conduit and the exterior surface of the reaction chamber.

18. The process of claim 1, wherein the heated reactor conduit is present on less than about 10% of the surface area of the exterior surface of the reaction chamber.

19. The process of claim 1, wherein:
    the external heating system comprises a cover over the heated reactor conduit, the cover configured to be removably attached to the exterior surface of the reaction chamber; and
    the exterior surface of the reaction chamber further comprises an attachment point configured for the removable attachment of the cover.

* * * * *